United States Patent
Furukawa

(10) Patent No.: US 9,874,947 B2
(45) Date of Patent: Jan. 23, 2018

(54) DISPLAY CONTROL APPARATUS AND CONTROL METHOD THEREFOR, AND IMAGING APPARATUS AND CONTROL METHOD THEREFOR

(71) Applicant: CANON KABUSHIKI KAISHA, Tokyo (JP)

(72) Inventor: Nobuyuki Furukawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/284,274

(22) Filed: Oct. 3, 2016

(65) Prior Publication Data
US 2017/0097691 A1    Apr. 6, 2017

(30) Foreign Application Priority Data
Oct. 5, 2015 (JP) .................................. 2015-197907

(51) Int. Cl.
G09G 5/00 (2006.01)
G06F 3/0346 (2013.01)
G06F 3/041 (2006.01)

(52) U.S. Cl.
CPC .......... *G06F 3/0346* (2013.01); *G06F 3/0412* (2013.01); *G06F 3/0416* (2013.01)

(58) Field of Classification Search
CPC ..... G06F 3/0346; G06F 3/0416; G06F 3/0412
See application file for complete search history.

(56) References Cited

U.S. PATENT DOCUMENTS

| | | | |
|---|---|---|---|
| 2013/0120240 A1* | 5/2013 | Hong | G06F 3/03 345/156 |
| 2013/0147844 A1* | 6/2013 | Isozu | H04N 5/232 345/659 |
| 2014/0085341 A1* | 3/2014 | Shin | G09G 5/38 345/659 |

FOREIGN PATENT DOCUMENTS

| | | |
|---|---|---|
| JP | 2000-312329 A | 11/2000 |
| JP | 2008-177819 A | 7/2008 |
| JP | 2013-150129 A | 8/2013 |

* cited by examiner

*Primary Examiner* — Rodney Amadiz
(74) *Attorney, Agent, or Firm* — Canon U.S.A., Inc. IP Division

(57) ABSTRACT

A display control apparatus for controlling displaying of a display unit includes an orientation detection unit configured to detect an orientation of the display control apparatus, and a display control unit configured to, when an orientation change from a first orientation to a second orientation of the display control apparatus is detected by the orientation detection unit, perform display control based on the second orientation after the orientation change in a case where a speed of the orientation change is higher than a predetermined speed, and perform display control based on the first orientation even after the orientation change in a case where the speed of the orientation change is lower than or equal to the predetermined speed.

17 Claims, 11 Drawing Sheets

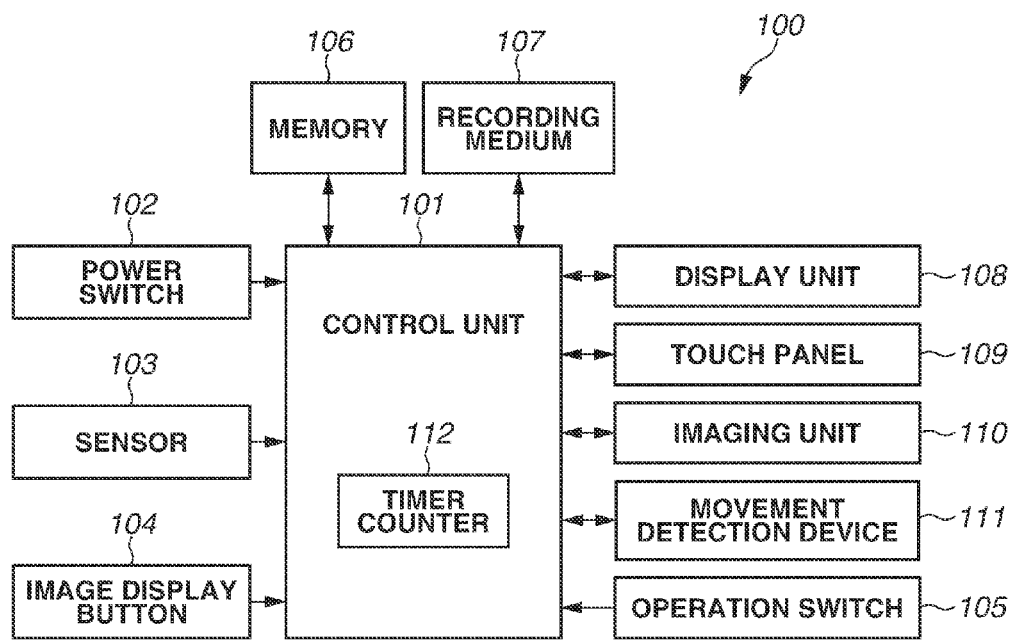
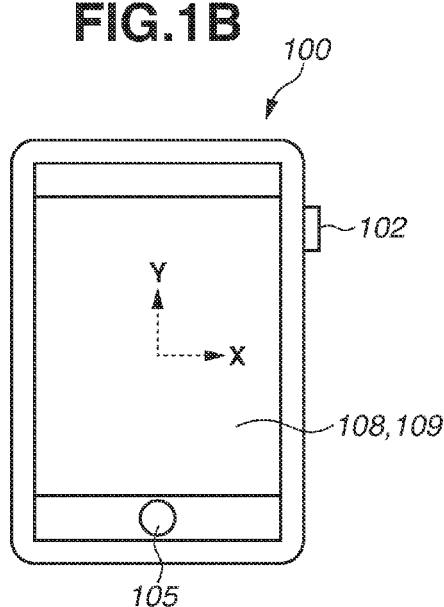 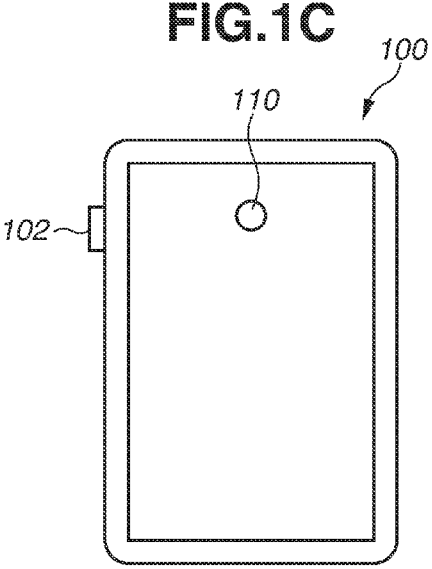

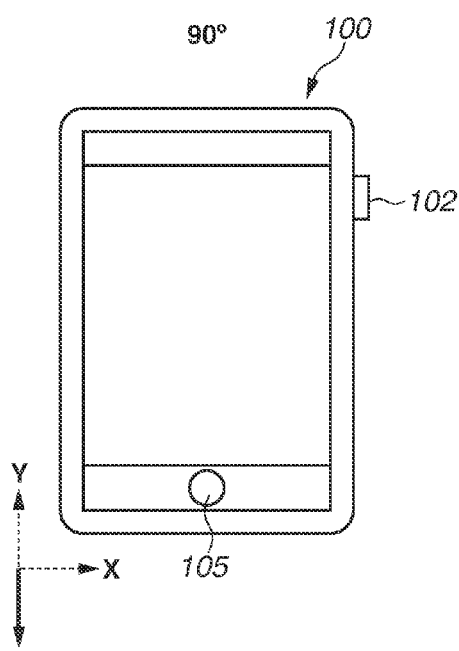
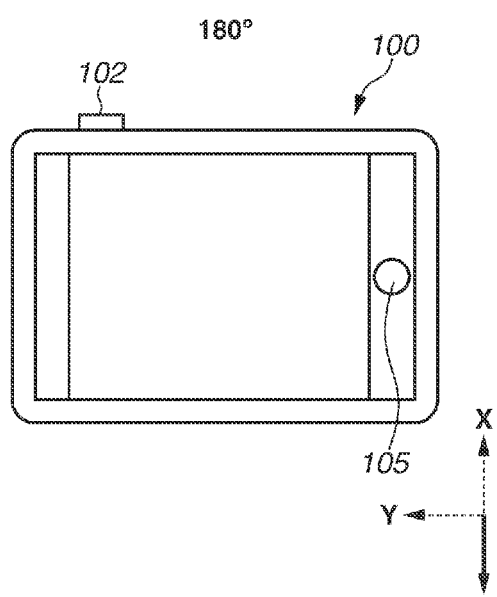
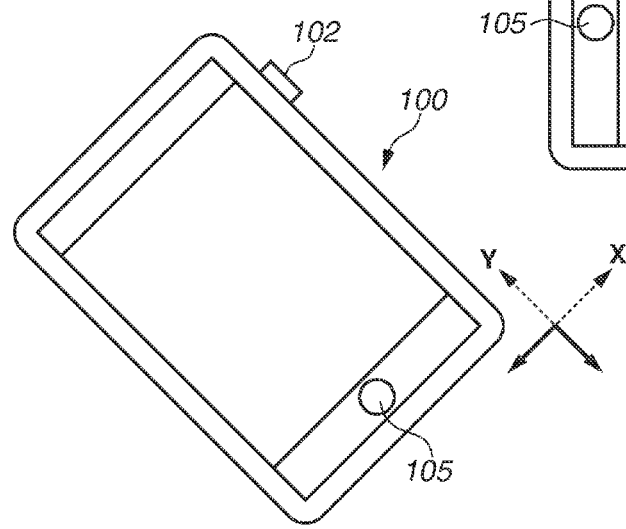
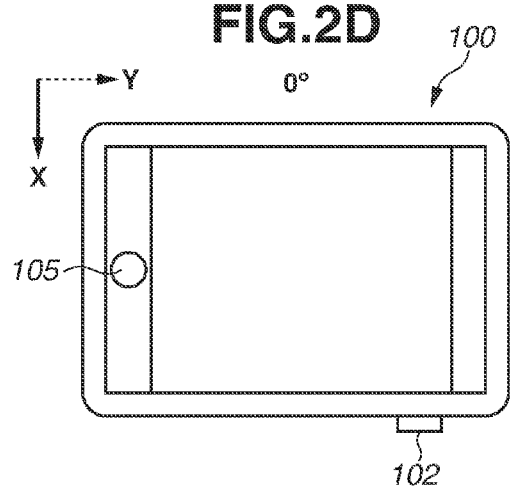

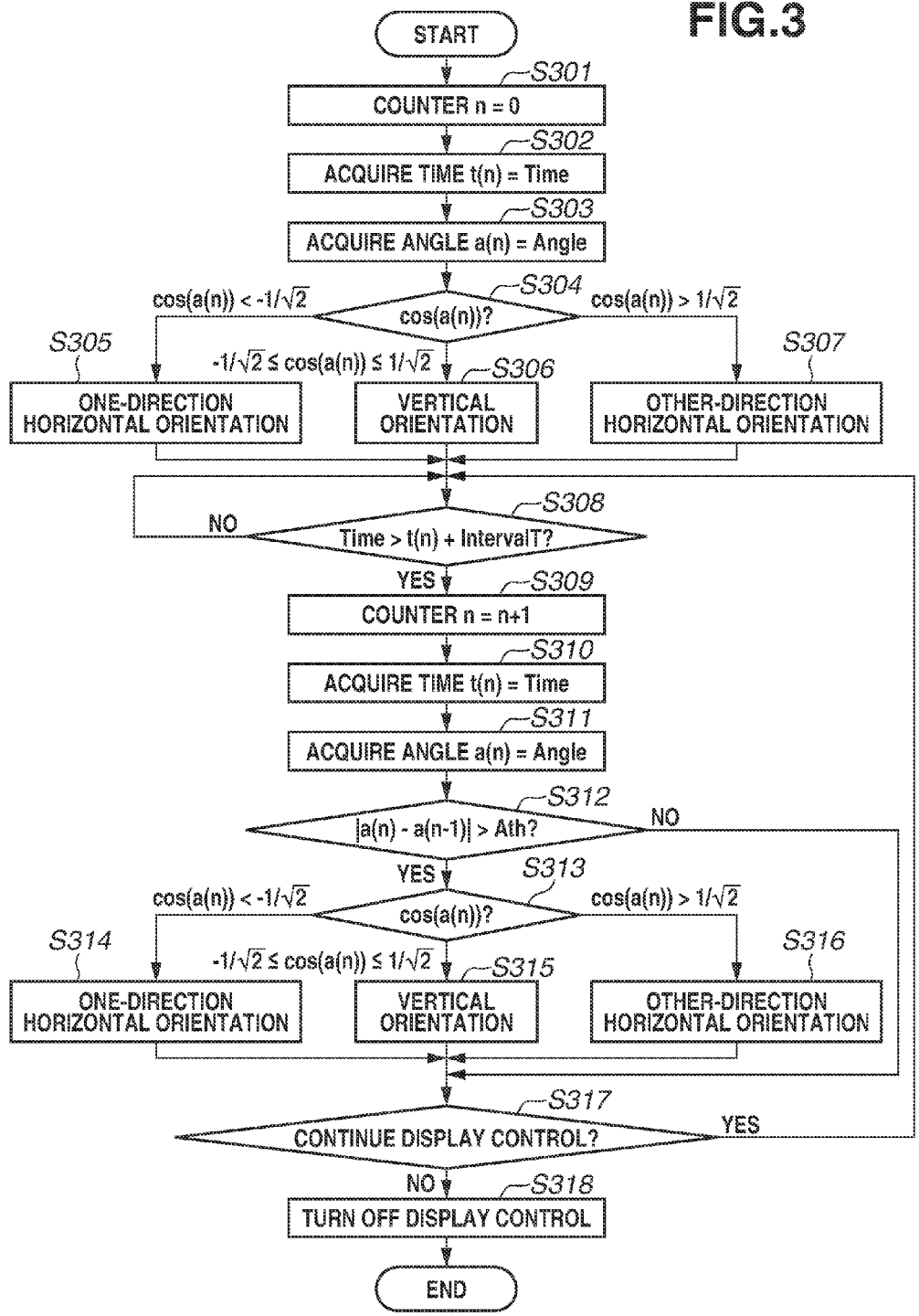

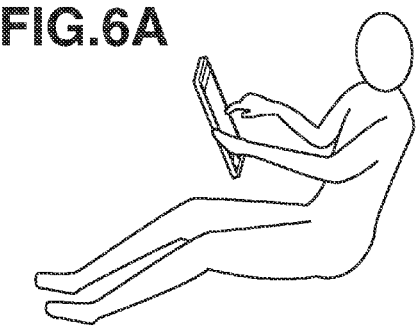
FIG.6A
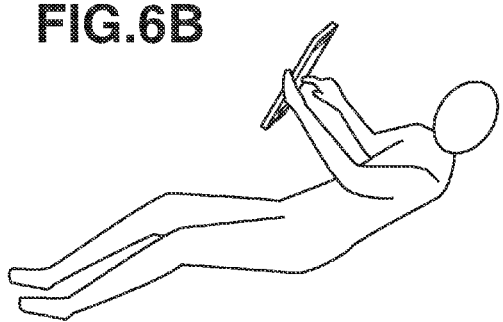
FIG.6B
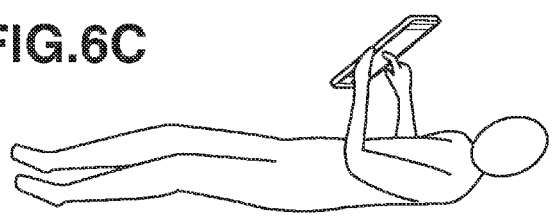
FIG.6C
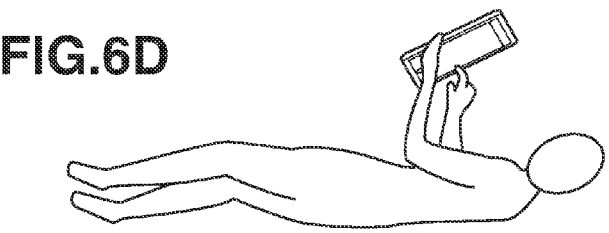
FIG.6D
FIG.6E
FIG.6F
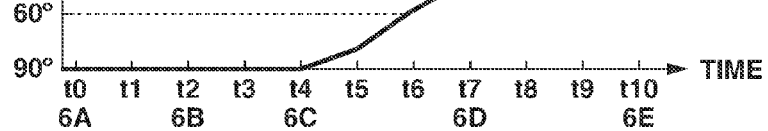

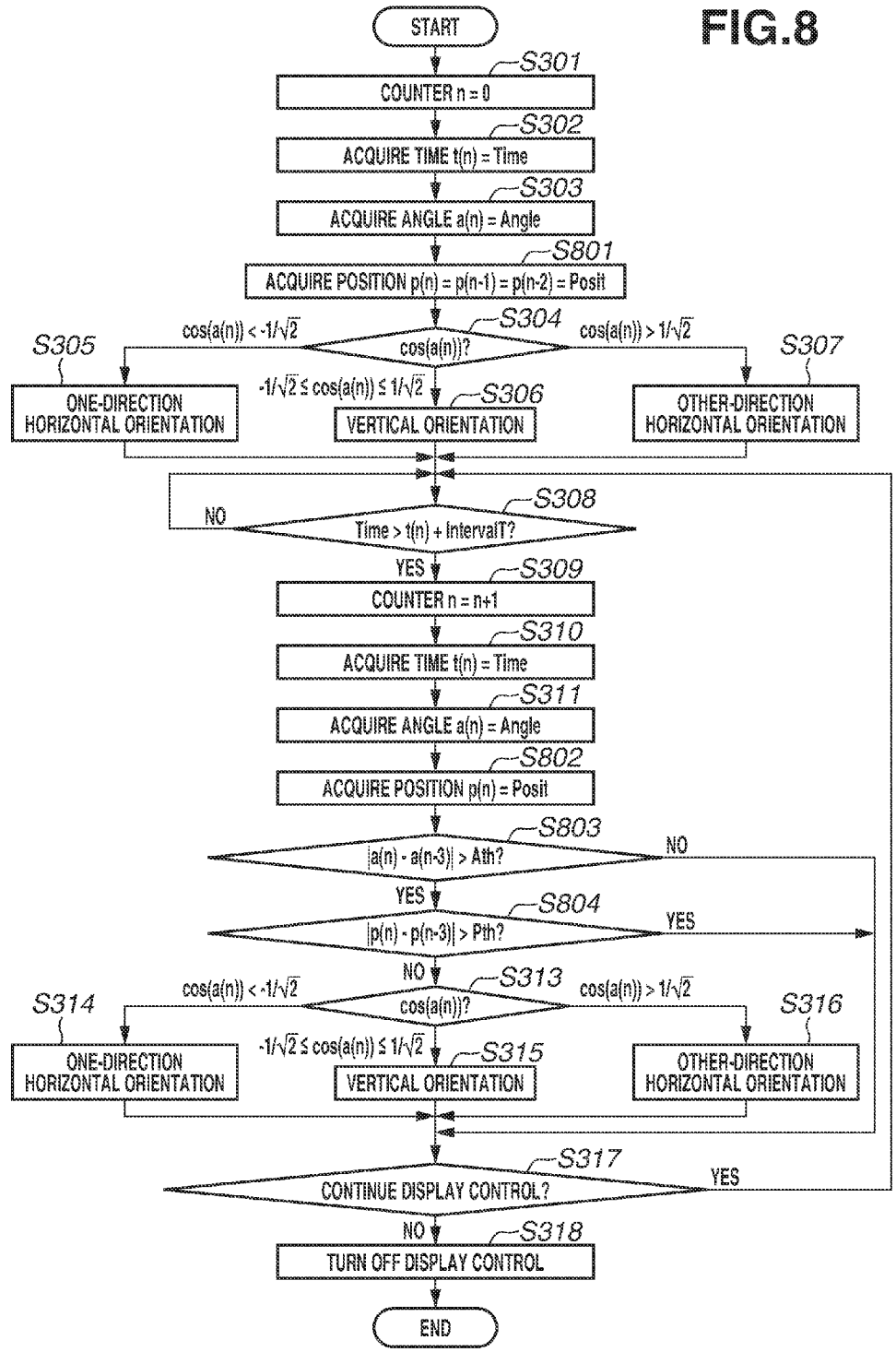

DISPLAY CONTROL APPARATUS AND CONTROL METHOD THEREFOR, AND IMAGING APPARATUS AND CONTROL METHOD THEREFOR

BACKGROUND OF THE INVENTION

Field of the Invention

Aspects of the present disclosure generally relate to a display control apparatus and a control method therefor and an imaging apparatus and a control method therefor. In particular, the present disclosure relates to a technique related to control performed based on the orientation of an apparatus.

Description of the Related Art

There are known conventional imaging apparatuses or display apparatuses that perform control based on orientation information detected via an orientation detection unit. Such an imaging apparatus can diversify weighting of light metering evaluation or subject detection or can record a shooting orientation in association with a captured image and use the shooting orientation as an aid in rotational display at the time of playback. Moreover, such a display apparatus can detect an orientation displayed at the time of playback and change the displaying orientation of an image to be displayed on a display unit.

Japanese Patent Application Laid-Open No. 2000-312329 discusses an image processing apparatus that performs image rotation processing on captured image data based on a result of whether a state of orientation of the apparatus taken at the time of playback and a state of shooting orientation recorded along with the captured image data coincide with each other, and displays the captured image data in a correct orientation.

On the other hand, some users may desire to view an image in an intended displaying orientation irrespective of a state of orientation of an apparatus used for displaying.

Japanese Patent Application Laid-Open No. 2008-177819 discusses a mobile terminal apparatus that captures the face image of a user with a camera mounted on the same side as a display unit and rotates the orientation of an image in agreement with the orientation of the face of the user to display the image on the display unit.

Japanese Patent Application Laid-Open No. 2013-150129 discusses a mobile terminal that rotates the orientation of an image to be displayed on a display unit, based on the position touched by a hand holding a casing, which is detected by a contact sensor mounted on the back side of the casing, and the orientation of the casing.

However, the mobile terminal apparatus discussed in Japanese Patent Application Laid-Open No. 2008-177819 requires a camera used to capture an image of the user and also needs to activate the camera for the purpose of dealing with the displaying orientation even when displaying an image.

Furthermore, the mobile terminal discussed in Japanese Patent Application Laid-Open No. 2013-150129 acts only in the case of holding the casing in a specified pattern, and cannot deal with various holding patterns for the casing.

As mentioned above, conventional techniques may involve an issue in which it is not easy to display an image in a displaying orientation intended by the user.

SUMMARY OF THE INVENTION

Aspects of the present disclosure are generally directed to enabling displaying an image in a displaying orientation intended by the user.

According to an aspect of the present disclosure, a display control apparatus for controlling displaying of a display unit includes an orientation detection unit configured to detect an orientation of the display control apparatus, and a display control unit configured to, when an orientation change from a first orientation to a second orientation of the display control apparatus is detected by the orientation detection unit, perform display control based on the second orientation after the orientation change in a case where a speed of the orientation change is higher than a predetermined speed, and perform display control based on the first orientation even after the orientation change in a case where the speed of the orientation change is lower than or equal to the predetermined speed.

According to another aspect of the present invention, an imaging apparatus includes an orientation detection unit configured to detect an orientation of the imaging apparatus, and a control unit configured to, when an orientation change from a first orientation to a second orientation of the imaging apparatus is detected by the orientation detection unit, perform control based on the second orientation after the orientation change in a case where a speed of the orientation change is higher than a predetermined speed, and perform control based on the first orientation even after the orientation change in a case where the speed of the orientation change is lower than or equal to the predetermined speed.

Further features of the present disclosure will become apparent from the following description of exemplary embodiments with reference to the attached drawings.

BRIEF DESCRIPTION OF THE DRAWINGS

FIGS. 1A, 1B, and 10 illustrate a configuration of a display apparatus.

FIGS. 2A, 2B, 2C, and 2D illustrate an operation of a sensor.

FIG. 3 is a flowchart illustrating display control according to a first exemplary embodiment.

FIGS. 6A, 6B, 6C, 6D, 6E, and 6F illustrate conditions in which the user views an image.

FIG. 8 is a flowchart illustrating display control according to a second exemplary embodiment.

FIG. 10 is a flowchart illustrating display control according to a third exemplary embodiment.

DESCRIPTION OF THE EMBODIMENTS

Figure 4A:
FIGS. 4A, 4B, and 4C illustrate conditions in which the user views an image.

Various exemplary embodiments, features, and aspects of the disclosure will be described in detail below with reference to the drawings. It is to be noted that the following exemplary embodiments are merely examples for implementing the present disclosure and can be appropriately modified or changed depending on individual configurations and various conditions of apparatuses to which the present disclosure is applied. Thus, the present disclosure is in no way limited to the following exemplary embodiments.

In a first exemplary embodiment, an example is described in which a display control apparatus is applied to a display apparatus. Herein, the display apparatus is an apparatus portable by users, and can be, for example, a mobile-phone terminal, such as a smartphone.

FIG. 1A illustrates a schematic configuration of a display apparatus 100.

The display apparatus 100 includes, among others, a control unit 101, a power switch 102, a sensor 103, an image display button 104, an operation switch 105, a memory 106, a recording medium 107, a display unit 108, a touch panel 109, an imaging unit 110, a movement detection device 111, and a timer counter 112.

The control unit 101, which is, for example, a central processing unit (CPU), controls the entirety of the display apparatus 100. The power switch 102 can be pressed by the user to power on and off the display apparatus 100. The sensor 103, which is at least one of, for example, an acceleration sensor, a gyro sensor, and a geomagnetic sensor, outputs an orientation of the display apparatus 100. The image display button 104 can be pressed by the user to display an image or a menu screen on the display unit 108. The operation switch 105 can be pressed by the user to perform various settings. As used herein, the term "unit" generally refers to any combination of hardware, firmware, software or other component, such as circuitry, that is used to effectuate a purpose.

The memory 106, which is, for example, a volatile memory such as a random access memory (RAM), temporarily stores, for example, image data, characters, and graphics to be displayed, or temporarily stores results of computation performed by the control unit 101. The recording medium 107, which is, for example, a nonvolatile memory such as a semiconductor memory, records data and programs used for control, or records image data. The recording medium 107 is an example of a recording unit, and, specifically, can be an electrically erasable programmable read-only memory (EEPROM) or a flash read-only memory (ROM). Moreover, the recording medium 107 can be attachable to and detachable from the display apparatus 100. The display unit 108, which is, for example, a thin-film transistor (TFT) liquid crystal display, displays, for example, an image and a menu screen.

The touch panel 109, which is located on the display surface of the display unit 108, detects a touch or access operation on the display unit 108 performed by the user with the finger, pen, or the like. The imaging unit 110 captures a still image or a moving image. Furthermore, in the first to third exemplary embodiments, the imaging unit 110 can be omitted. The movement detection device 111 detects position information about the display apparatus 100 and sends the position information to the control unit 101. The movement detection device 111 can be, for example, a device capable of acquiring the absolute position by receiving a radio wave compliant with, for example, the Global Positioning System (GPS) or Wi-Fi (the predetermined wireless local area network (LAN) standard), or a device capable of acquiring the relative position, such as a gyro sensor or an acceleration sensor. Moreover, the movement detection device 111 is not limited to one in number, and can be obtained by combining the above-mentioned devices or sensors. Additionally, in the first exemplary embodiment, the movement detection device 111 can be omitted. The timer counter 112 acquires time information. While, in the present exemplary embodiment, the timer counter 112 is included in the control unit 101, this is not limiting, and the timer counter 112 can be separate from the control unit 101 and be connected to the control unit 101 via external connection.

FIG. 1B illustrates an appearance configuration of the side on which the display unit 108 is mounted (the front side) of the display apparatus 100. Moreover, the constituent members mentioned above with reference to FIG. 1A are assigned the respective same reference numerals, and the description thereof is omitted as appropriate.

As illustrated in FIG. 1B, at the central portion of the display apparatus 100, the display unit 108, which is rectangular, is located and the touch panel 109 is also located in such a way as to be able to detect a touch operation on the display surface of the display unit 108. Furthermore, in the display apparatus 100, the power switch 102 is located at the right side thereof, and the operation switch 105 is located below the display unit 108.

FIG. 1C illustrates an appearance configuration of the back side of the display apparatus 100. Thus, the power switch 102 appears to be located on the observers' left. Moreover, in the display apparatus 100, the imaging unit 110 is located at the slightly upper portion of the back side.

Furthermore, the outer shape of the display apparatus 100 itself is a vertically-long rectangle with long sides and short sides. Moreover, the outer shape of the display unit 108 is also a rectangle with long sides and short sides. Typically, the orientation of the display apparatus 100 illustrated in FIG. 1B is called the vertical orientation, and the orientation obtained by rotating the display apparatus 100 90° from the condition illustrated in FIG. 1B is called the horizontal orientation. In the present exemplary embodiment, the case where the display apparatus 100 is in the vertical orientation is referred to as the case where it is in the normal position.

Next, an operation of the sensor 103 for outputting an orientation of the display apparatus 100 is described. Herein, a case is described in which the sensor 103 is a biaxial acceleration sensor. Moreover, the sensor 103 can be a triaxial acceleration sensor.

The sensor 103 produces two outputs for X-axis and Y-axis. Herein, the X-axis is an axis which is parallel to the display surface and is also parallel to the short sides of the outer shape of the display apparatus 100. Moreover, the Y-axis is an axis which is parallel to the display surface and is also parallel to the long sides of the outer shape of the display apparatus 100.

FIGS. 2A to 2D illustrate an operation of the sensor 103. FIGS. 2A to 2D also illustrate outputs of the sensor 103 obtained when the orientation of the display apparatus 100 is changed. Herein, the X-axis and Y-axis are indicated by dashed arrows, and the length of each dashed arrow is set to "1", which is the maximum level with respect to gravity. On the other hand, the outputs for X-axis and Y-axis of the sensor 103 are indicated by solid arrows, and the length of each solid arrow corresponds to an output value. The control unit 101 detects the orientation of the display apparatus 100 based on the output value of the sensor 103.

FIG. 2A illustrates an output of the sensor 103 obtained when the display apparatus 100 is held in the vertical orientation. As illustrated in FIG. 2A, when the display apparatus 100 is in the vertical orientation, the output value for Y-axis is approximately "−1". On the other hand, the output value for X-axis is approximately "0". Thus, the control unit 101 determines that the angle of the display apparatus 100 is 90° and the display apparatus 100 is in the vertical orientation based on the output values for X-axis and Y-axis.

FIG. 2B illustrates an output of the sensor 103 obtained when the display apparatus 100 is slightly slanted. As illustrated in FIG. 2B, when the display apparatus 100 is slanted, the output value for X-axis and the output value for Y-axis have approximately the same value. Thus, the control unit 101 determines that the angle of the display apparatus 100 is 135° based on the output values for X-axis and Y-axis having the same value.

FIG. 2C illustrates an output of the sensor 103 obtained when the display apparatus 100 is held in the horizontal orientation, more specifically, when the power switch 102 appears to be located above. When the display apparatus 100 is in the horizontal orientation as illustrated in FIG. 2C, the output value for X-axis is approximately "−1". On the other hand, the output value for Y-axis is approximately "0". Thus, the control unit 101 determines that the angle of the display apparatus 100 is 180° and the display apparatus 100 is in the horizontal orientation based on the output values for X-axis and Y-axis. Moreover, for ease of illustration, this orientation is referred to as a "one-direction horizontal orientation".

FIG. 2D illustrates an output of the sensor 103 obtained when the display apparatus 100 is held in the horizontal orientation, more specifically, when the power switch 102 appears to be located below. When the display apparatus 100 is in the horizontal orientation as illustrated in FIG. 2D, the output value for X-axis is approximately "1". On the other hand, the output value for Y-axis is approximately "0". Thus, the control unit 101 determines that the angle of the display apparatus 100 is 0° and the display apparatus 100 is in the horizontal orientation based on the output values for X-axis and Y-axis. Moreover, for ease of illustration, this orientation is referred to as an "other-direction horizontal orientation".

Next, display control of the display apparatus 100 is described with reference to the flowchart of FIG. 3. The flowchart illustrated in FIG. 3 is implemented by the control unit 101 loading a program recorded on the recording medium 107 onto the memory 106 and executing the program. Moreover, the flowchart of FIG. 3 is started in response to an instruction to display, on the display unit 108, an image recorded on the recording medium 107.

In step S301, the control unit 101 resets a counter n to "0", which is an initial value, and stores the value in the memory 106.

In step S302, the control unit 101 acquires current time Time from the timer counter 112, substitutes the current time Time into a variable of time t(n), and stores the variable of time t(n) in the memory 106.

In step S303, the control unit 101 acquires the angle of the display apparatus 100 based on the outputs of the sensor 103. More specifically, the control unit 101 acquires an angle Angle of the display apparatus 100 by calculating the angle Angle based on the output values for X-axis and Y-axis output from the sensor 103. The control unit 101 substitutes the acquired angle Angle into a variable of angle a(n), and stores the variable of angle a(n) in the memory 106.

In steps S304 to S307, the control unit 101 detects the orientation of the display apparatus 100 based on the angle of the display apparatus 100. This processing corresponds to an example of processing performed by an orientation detection unit. Here, the control unit 101, in step S304, calculates "cos(a(n))" using the variable of angle a(n), and, in steps S305 to S307, detects the orientation based on the value obtained by calculating "cos(a(n))".

More specifically, if the value of the "cos(a(n))" is less than $-1/\sqrt{2}(\cos(a(n))<-1/\sqrt{2})$, the processing proceeds to step S305, in which the control unit 101 determines that the orientation of the display apparatus 100 is the one-direction horizontal orientation (typically, the orientation illustrated in FIG. 2C). Accordingly, the control unit 101 displays content such as an image (hereinafter referred to simply as an "image") on the display unit 108 based on the one-direction horizontal orientation of the display apparatus 100. In other words, the control unit 101 rotates the image, which has been displayed as illustrated in FIG. 2A, 90° to the right with respect to the display apparatus 100 and displays the rotated image on the display unit 108. This processing corresponds to an example of processing performed by a display control unit.

Furthermore, if the value of the "cos(a(n))" is equal to or greater than $-1/\sqrt{2}$ and equal to or less than $1/\sqrt{2}(-1/\sqrt{2} \leq \cos(a(n)) \leq 1/\sqrt{2})$, the processing proceeds to step S306, in which the control unit 101 determines that the orientation of the display apparatus 100 is the vertical orientation (typically, the orientation illustrated in FIG. 2A). Accordingly, the control unit 101 displays the image on the display unit 108 based on the display apparatus 100 being in the vertical orientation.

Moreover, if the value of the "cos(a(n))" is greater than $1/\sqrt{2}(\cos(a(n))>1/\sqrt{2})$, the processing proceeds to step S307, in which the control unit 101 determines that the orientation of the display apparatus 100 is the other-direction horizontal orientation (typically, the orientation illustrated in FIG. 2D). Accordingly, the control unit 101 displays the image on the display unit 108 based on the other-direction horizontal orientation of the display apparatus 100. In other words, the control unit 101 rotates the image, which has been displayed as illustrated in FIG. 2A, 90° to the left with respect to the display apparatus 100 and displays the rotated image on the display unit 108.

Thus, in the present exemplary embodiment, if the variable of angle a(n) is greater than 135°, the one-direction horizontal orientation is determined, if it is equal to or greater than 45° and equal to or less than 135°, the vertical orientation is determined, and, if it is less than 45°, the other-direction horizontal orientation is determined.

Next, in step S308, the control unit 101 acquires current time Time from the timer counter 112, and determines whether the current time Time is time at which a time IntervalT for a next counting calculation has elapsed from the variable of time t(n) stored in the memory 106. If the time IntervalT has not yet elapsed (NO in step S308), the processing waits until the time IntervalT elapses. If the time IntervalT has elapsed (YES in step S308), the processing proceeds to step S309.

In step S309, the control unit 101 adds "1" to the counter n to start calculation for a next step.

In step S310, the control unit 101 acquires current time Time from the timer counter 112, substitutes the current time Time into the variable of time t(n), and stores the variable of time t(n) in the memory 106.

In step S311, as in step S303, the control unit 101 acquires the angle Angle of the display apparatus 100 by calculating the angle Angle based on the output values output from the sensor 103. The control unit 101 substitutes the acquired angle Angle into the variable of angle a(n), and stores the variable of angle a(n) in the memory 106.

In step S312, the control unit 101 determines whether the orientation of the display apparatus 100 has changed by an angle larger than a predetermined angle. More specifically, the control unit 101 compares a variable of angle a(n−1) obtained one count before and the current variable of angle a(n) stored in step S311 with each other, and determines whether the angular difference in orientation of the display apparatus 100 is greater than a threshold value Ath. Here, the control unit 101 calculates the absolute value of a value obtained by subtracting the variable of angle a(n−1) obtained one count before from the current variable of angle a(n) stored in step S311. If the angular difference is greater than the threshold value Ath (YES in step S312), the processing proceeds to step S313.

Furthermore, since processing in step S312 is started when the time IntervalT has elapsed in step S308, step S312 is provided to substantially determine an amount of change per the time IntervalT, i.e., a speed of orientation change. In other words, in step S312, the control unit 101 determines whether the speed of orientation change of the display apparatus 100 is higher than a predetermined speed.

Next, processing in steps S313 to S316, which is processing for controlling a displaying operation of the display unit 108 according to the orientation of the display apparatus 100, is similar to the processing in steps S304 to S307, and, therefore, the description thereof is omitted.

Furthermore, a case where, in step S312, it is determined that the angular difference is not greater than the threshold value Ath corresponds to a case where the orientation change of the display apparatus 100 is small during the time IntervalT. In this case (NO in step S312), the processing proceeds to step S317 without passing through steps S313 to S316.

In step S317, the control unit 101 determines whether to continue display control. If the control unit 101 determines to continue display control (YES in step S317), the processing returns to step S308, and, if the control unit 101 determines to end display control (NO in step S317), the processing proceeds to step S318. More specifically, the control unit 101 determines to end display control, for example, in a case where the control unit 101 is instructed by the user via the image display button 104 to turn off displaying of an image or via the power switch 102 to power off the display apparatus 100. On the other hand, if the control unit 101 is not instructed via the image display button 104 or the power switch 102 for turning off or powering off, the processing returns to step S308.

In step S318, the control unit 101 turns off the display unit 108, thus ending display control.

In this way, according to the present exemplary embodiment, in a case where the orientation of the display apparatus 100 has changed with the speed of orientation change of the display apparatus 100 being higher than a predetermined speed, the control unit 101 presumes that the user has consciously changed the orientation of the display apparatus 100, more specifically, has quickly rotated the display apparatus 100 on the spot. In this case, the control unit 101 rotates a displaying orientation of an image with respect to the display apparatus 100, thus performing display control according to the orientation of the display apparatus 100 (corresponding to processing in steps S313 to S316).

On the other hand, in a case where the speed of orientation change of the display apparatus 100 is not higher than the predetermined speed, i.e., in a case where the user has slowly changed the orientation of the display apparatus 100, the control unit 101 presumes that the orientation change of the display apparatus 100 is an orientation change associated with the posture of the user. More specifically, the control unit 101 presumes that the user has lain down or gotten up while holding the display apparatus 100. In this case, the control unit 101 does not rotate a displaying orientation of an image with respect to the display apparatus 100, thus enabling displaying the image in a displaying orientation intended by the user.

Here, a difference in operation of the display apparatus 100 between a case where the display apparatus 100 is quickly rotated and a case where the display apparatus 100 is slowly rotated is described.

Figure 4B:
Figure 4C:
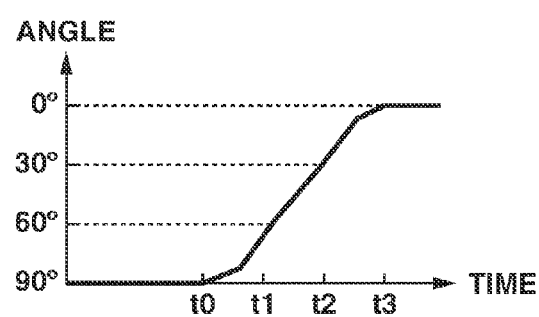

FIGS. 4A, 4B, and 4C illustrate conditions in which the user rotates the display apparatus 100 on the spot and views an image.

FIG. 4A illustrates a condition in which the user is holding the display apparatus 100 in the vertical orientation, which is the same orientation as that of the display apparatus 100 illustrated in FIG. 2A. Thus, the angle of the display apparatus 100 is 90°.

On the other hand, FIG. 4B illustrates a condition in which, after quickly rotating the display apparatus 100 from the condition illustrated in FIG. 4A, the user is holding the display apparatus 100 in the other-direction horizontal orientation, which is the same orientation as that of the display apparatus 100 illustrated in FIG. 2D. Thus, the angle of the display apparatus 100 is 0°.

FIG. 4C is a graph illustrating a change in angle of the display apparatus 100 with respect to time.

Supposing that the time in the condition illustrated in FIG. 4A is time t0 and the time IntervalT is 0.2 seconds, the angle of the display apparatus 100 is changing in such a manner as to be approximately 70° at time t1, which is 0.2 seconds later, approximately 30° at time t2, which is 0.4 seconds later, and 0° at time t3, which is 0.6 seconds later.

FIGS. 5A, 5B, 5C, and 5D illustrate examples of display of an image displayed on the display unit 108 when the orientation of the display apparatus 100 is changed from the condition illustrated in FIG. 4A up to the condition illustrated in FIG. 4B. Furthermore, shifting from the condition illustrated in FIG. 4A to the condition illustrated in FIG. 4B usually uses about 0.6 seconds to 1.0 seconds. Here, a description is made with the assumption that the time IntervalT is 0.2 seconds and the threshold value Ath is 30°.

Figure 5A:
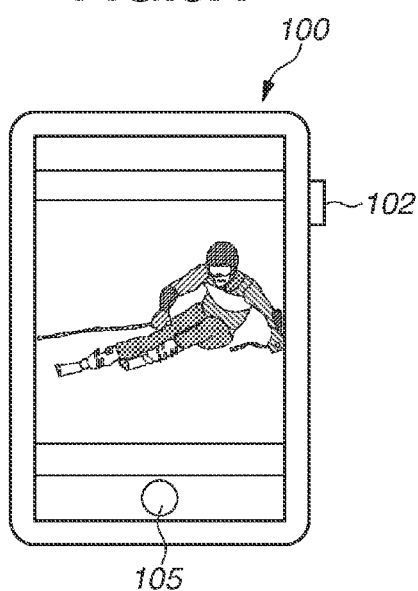
FIGS. 5A, 5B, 5C, and 5D illustrate examples of display of an image.

FIG. 5A illustrates an example in which an image captured in the horizontal orientation is displayed on the display unit 108 of the display apparatus 100 held in the vertical orientation. Here, the user is about to rotate the display apparatus 100 in order to view the image in the horizontal orientation.

Figure 5C:
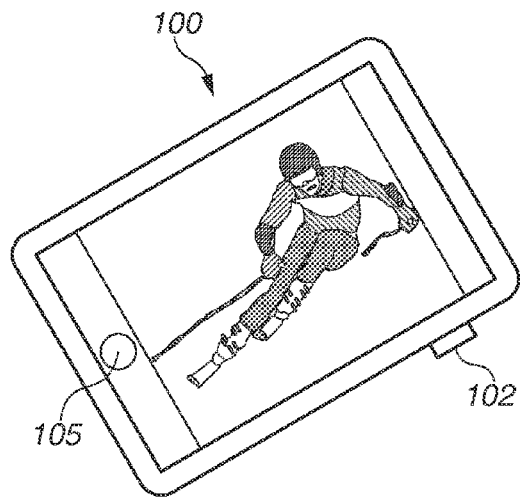
Figure 5B:
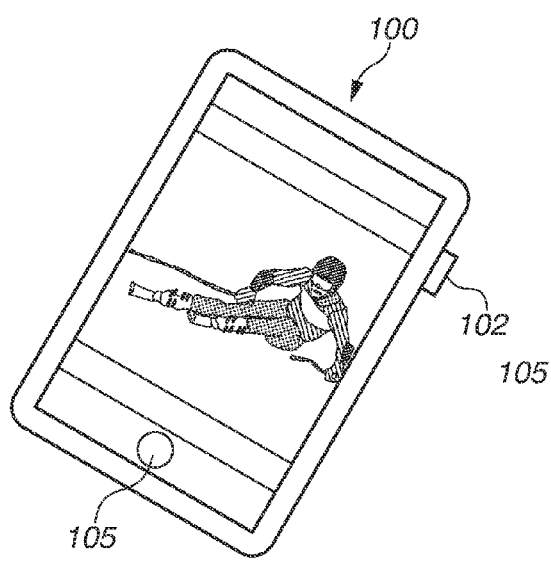

FIG. 5B illustrates an example of display on the display unit 108 obtained 0.2 seconds after the rotation to the right of the display apparatus 100 is started from the condition illustrated in FIG. 5A. Here, the angle of the display apparatus 100 is 70°, and the angular difference from the angle illustrated in FIG. 5A is 20° (i.e., =90°−70°). In this case, in step S312, the control unit 101 determines that the angular difference (20°) is not greater than the threshold value Ath=30° (NO in step S312), and the processing proceeds to step S317. Accordingly, since the control unit 101 does not perform display control according to the orientation of the display apparatus 100, as illustrated in FIG. 5B, the displaying orientation of the image with respect to the display apparatus 100 is the same as that illustrated in FIG. 5A.

FIG. 5C illustrates an example of display on the display unit 108 obtained 0.2 seconds after the condition illustrated in FIG. 5B. Here, the angle of the display apparatus 100 is 30°, and the angular difference from the angle illustrated in FIG. 5B is 40° (i.e., =70°−30°). In this case, in step S312, the control unit 101 determines that the angular difference (40°) is greater than the threshold value Ath=30° (YES in step S312), and the processing proceeds to step S313. Here, the processing proceeds from step S313 to step S316, in which the control unit 101 determines that the orientation of the display apparatus 100 is the other-direction horizontal orientation, so that the control unit 101 rotates the image, which has been displayed as illustrated in FIG. 5B, 90° to the left with respect to the display apparatus 100 and displays the rotated image on the display unit 108, as illustrated in FIG. 5C.

Figure 5D:
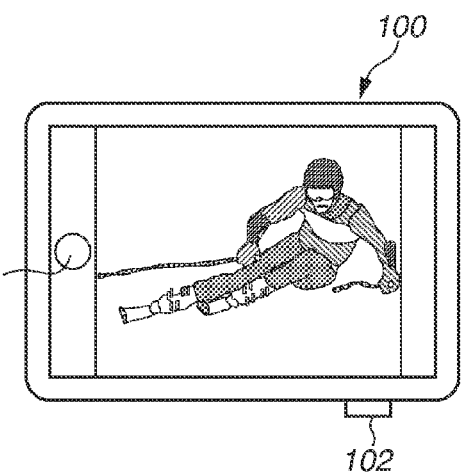

FIG. 5D illustrates an example of display on the display unit 108 obtained 0.2 seconds after the condition illustrated in FIG. 5C. Here, the angle of the display apparatus 100 is 0°, and the angular difference from the angle illustrated in FIG. 5C is 30° (i.e., =30°−0°). In this case, in step S312, the control unit 101 determines that the angular difference (30°) is not greater than the threshold value Ath=30° (NO in step S312), and the processing proceeds to step S317. Accordingly, since the control unit 101 does not perform display control according to the orientation of the display apparatus 100, as illustrated in FIG. 5D, the displaying orientation of the image with respect to the display apparatus 100 is the same as that illustrated in FIG. 5C.

In this way, the control unit 101 detects that the orientation of the display apparatus 100 has changed from a first orientation to a second orientation, and, when determining that the speed of the change in orientation is higher than a predetermined speed, presumes that the user has consciously changed the orientation of the display apparatus 100. In this case, the control unit 101 performs display control based on the second orientation after the orientation change. In other words, for example, in a case where the user has quickly rotated the display apparatus 100 from the vertical orientation to the horizontal orientation, when the display apparatus 100 has been held in the horizontal orientation, the control unit 101 rotates an image, which has been displayed in the vertical orientation, 90° with respect to the display apparatus 100 and displays the rotated image. Accordingly, the user can view the image in an intended displaying orientation.

FIGS. 6A, 6B, 6C, 6D, 6E, and 6F illustrate conditions in which the user views the display apparatus 100 while gradually lying down.

FIG. 6A illustrates a condition in which the user is holding the display apparatus 100 in the vertical orientation. FIG. 6B illustrates a condition in which the user has begun to lie down. FIG. 6C illustrates a condition in which the user has lain on the user's back. FIG. 6D illustrates a condition in which the user has turned over slightly on the user's right side. FIG. 6E illustrates a condition in which the user has completely turned over (assumed a recumbent posture) on the user's right side. Furthermore, in the conditions illustrated in FIGS. 6C to 6E, from the viewpoint of relative values of the visual line of the user, it is desirable that the displaying orientation of an image remain the same as the displaying orientation illustrated in FIG. 6B.

FIG. 6F is a graph illustrating a change in angle of the display apparatus 100 with respect to time.

Supposing that the time in the condition illustrated in FIG. 6A is time t0 and the time IntervalT is 0.2 seconds, the angle of the display apparatus 100 is changing in such a manner as to be 0° at time t2, which is 0.4 seconds later, and time t4, which is 0.8 seconds later, 60° at time t7, which is 1.4 seconds later, and 15° at time t10, which is 2.0 seconds later. Furthermore, it is supposed that the time in the condition illustrated in FIG. 6B is time t2, the time in the condition illustrated in FIG. 6C is time t4, the time in the condition illustrated in FIG. 6D is time t7, and the time in the condition illustrated in FIG. 6E is time t10.

FIGS. 7A, 7B, 7C, and 7D illustrate examples of display of an image displayed on the display unit 108 when the orientation of the display apparatus 100 is changed from the condition illustrated in FIG. 6C to the condition illustrated in FIG. 6E. Shifting from the condition illustrated in FIG. 6C to the condition illustrated in FIG. 6E usually uses about 1.0 seconds to 2.0 seconds. Moreover, at this time, a change in output of the acceleration sensor per unit time is weak.

Figure 7A:
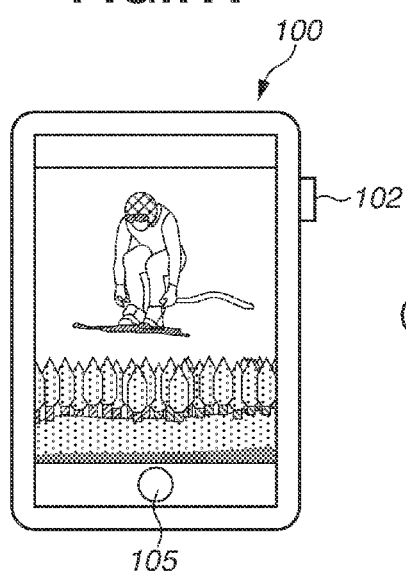
FIGS. 7A, 7B, 7C, and 7D illustrate examples of display of an image.

FIG. 7A illustrates an example in which an image captured in the vertical orientation is displayed on the display unit 108 of the display apparatus 100 held in the vertical orientation. Here, the user is about to turn over from lying on the user's back while holding the display apparatus 100, in order to view the image in a recumbent position. Furthermore, in the condition illustrated in FIG. 6A up to the condition illustrated in FIG. 6C, since, even when the user lies down, the angle of the display apparatus 100 does not change, the displaying orientation of the image displayed on the display unit 108 remains the same as the displaying orientation illustrated in FIG. 7A.

Figure 7B:
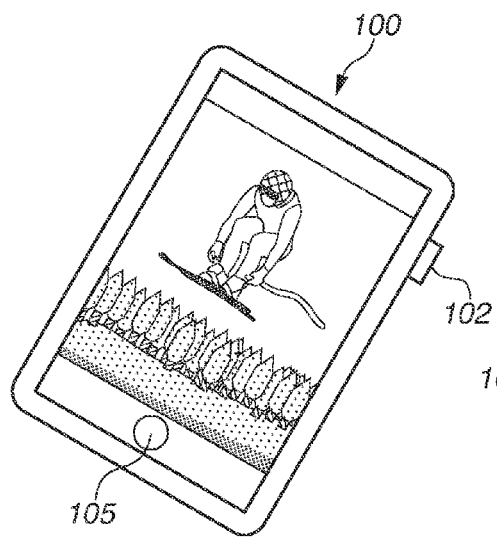

FIG. 7B illustrates an example of display on the display unit 108 obtained 0.4 seconds after the condition illustrated in FIG. 7A at time t4, i.e., obtained at time t6. Here, the angle of the display apparatus 100 is 60°, and the angular difference from the angle illustrated in FIG. 7A is 30° (i.e., =90°−60°). However, since the angular difference does not become greater than the threshold value Ath=30° within 0.2 seconds, which is the time IntervalT, the processing does not proceed from step S312 to step S313, but proceeds to step S317. Accordingly, since the control unit 101 does not perform display control according to the orientation of the display apparatus 100, as illustrated in FIG. 7B, the displaying orientation of the image with respect to the display apparatus 100 is the same as that illustrated in FIG. 7A.

Figure 7C:
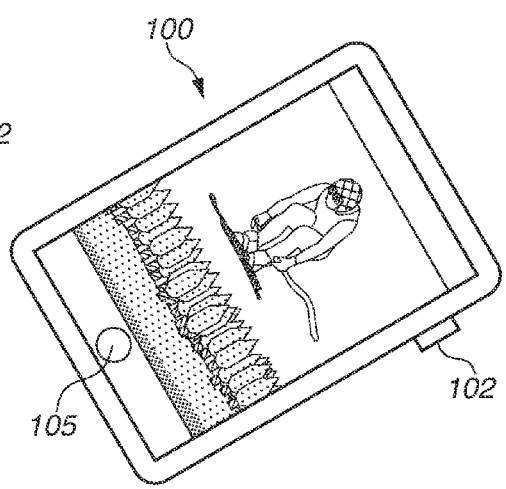

FIG. 7C illustrates an example of display on the display unit 108 obtained 0.4 seconds after the condition illustrated in FIG. 7B, i.e., obtained at time t8. Here, while the angle of the display apparatus 100 is 30°, since the angular difference does not become greater than the threshold value Ath within 0.2 seconds, which is the time IntervalT, as illustrated in FIG. 7C, the displaying orientation of the image with respect to the display apparatus 100 is the same as that illustrated in FIG. 7B.

Figure 7D:
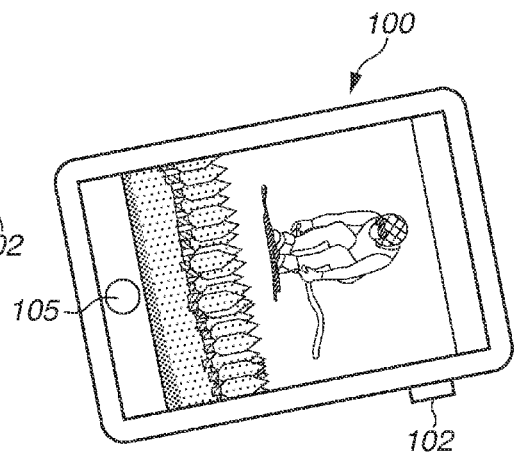

FIG. 7D illustrates an example of display on the display unit 108 obtained 0.4 seconds after the condition illustrated in FIG. 7C, i.e., obtained at time t10. Here, while the angle of the display apparatus 100 is 15°, since the angular difference does not become greater than the threshold value Ath within 0.2 seconds, which is the time IntervalT, as illustrated in FIG. 7D, the displaying orientation of the image with respect to the display apparatus 100 is the same as that illustrated in FIG. 7C.

In this way, the control unit 101 detects that the orientation of the display apparatus 100 has changed from a first orientation to a second orientation, and, when determining that the speed of the change in orientation is lower than or equal to a predetermined speed, presumes that the user has changed the orientation of the display apparatus 100 along with rotation of the body of the user. In this case, the control unit 101 performs display control based on the first orientation even after the orientation change. In other words, for example, in a case where the user has turned over and, thus, the orientation of the display apparatus 100 has changed from the vertical orientation to the horizontal orientation, even if the display apparatus 100 is in the horizontal orientation, the control unit 101 displays an image, which has been displayed in the vertical orientation, without changing the displaying orientation of the image with respect to the display apparatus 100. Accordingly, the user can view the image in an intended displaying orientation.

Next, display control according to a second exemplary embodiment is described with reference to the flowchart of FIG. 8. In the present exemplary embodiment, a case is described in which an image to be displayed on the display unit 108 is controlled using position information sent from the movement detection device 111. The flowchart illustrated in FIG. 8 is implemented by the control unit 101 loading a program recorded on the recording medium 107 onto the memory 106 and executing the program. The flowchart of FIG. 8 is the one obtained by adding processing in steps S801 to S804 to the flowchart of FIG. 3 described in the first exemplary embodiment. Accordingly, in the flowchart of FIG. 8, the same steps as those in the flowchart of FIG. 3 are assigned the respective same step numbers, and the description thereof is omitted.

In step S801, the control unit 101 detects the position of the display apparatus 100 by acquiring position information from the movement detection device 111. This processing corresponds to an example of processing performed by a position detection unit. The control unit 101 substitutes the detected position Posit into a variable of position p(n), and stores the variable in the memory 106. Furthermore, the control unit 101 previously detects positions of the display apparatus 100 for two counts prior to the current counter n, substitutes the respective detected positions into a variable p(n−1) and a variable p(n−2), and stores the variables in the memory 106. After that, processing in steps S304 to S311 is the same as in the first exemplary embodiment.

In step S802, the control unit 101 detects the position of the display apparatus 100 by acquiring position information from the movement detection device 111, substitutes the detected position Posit into a variable of position p(n), and stores the variable in the memory 106.

In step S803, the control unit 101 determines whether the orientation of the display apparatus 100 has changed by an angle larger than a predetermined angle. More specifically, the control unit 101 compares a variable of angle a(n−3) obtained three counts before and the current variable of angle a(n) with each other, and determines whether the angular difference in orientation of the display apparatus 100 is greater than a threshold value Ath. Here, the control unit 101 calculates the absolute value of a value obtained by subtracting the variable of angle a(n−3) obtained three counts before from the current variable of angle a(n). If the angular difference is not greater than the threshold value Ath (NO in step S803), the processing proceeds to step S317, and if the angular difference is greater than the threshold value Ath (YES in step S803), the processing proceeds to step S804.

In step S804, the control unit 101 determines whether the position of the display apparatus 100 has changed by an amount larger than a predetermined amount. More specifically, the control unit 101 compares a variable of position p(n−3) obtained three counts before the current counter and the current variable of position p(n) with each other, and determines whether the amount of movement of the display apparatus 100 is larger than a threshold value Pth. Here, the control unit 101 calculates the absolute value of a value obtained by subtracting the variable of position p(n−3) obtained three counts before from the current variable of position p(n). If the control unit 101 determines that the amount of movement is larger than the threshold value Pth (YES in step S804), the processing proceeds to step S317. If the control unit 101 determines that the amount of movement is not larger than the threshold value Pth (NO in step S804), the processing proceeds to step S313. Here, the case where the amount of movement is not larger than the threshold value Pth is presumed to be a case where the user is rotating the display apparatus 100 without moving the display apparatus 100, for example, quickly rotating the display apparatus 100 on the spot. On the other hand, the case where the amount of movement is larger than the threshold value Pth is presumed to be a case where the user is quickly rotating the display apparatus 100 while moving the display apparatus 100.

Figure 9A:
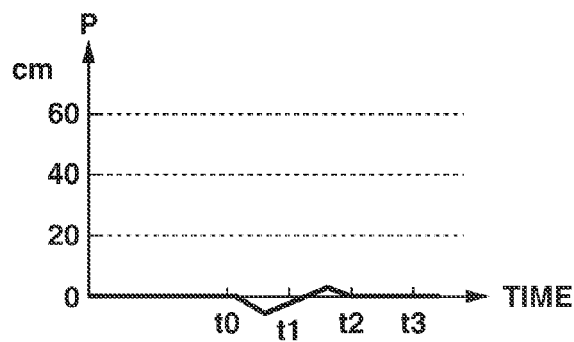
FIGS. 9A and 9B illustrate changes in position of the display apparatus with respect to time.
Figure 9B:
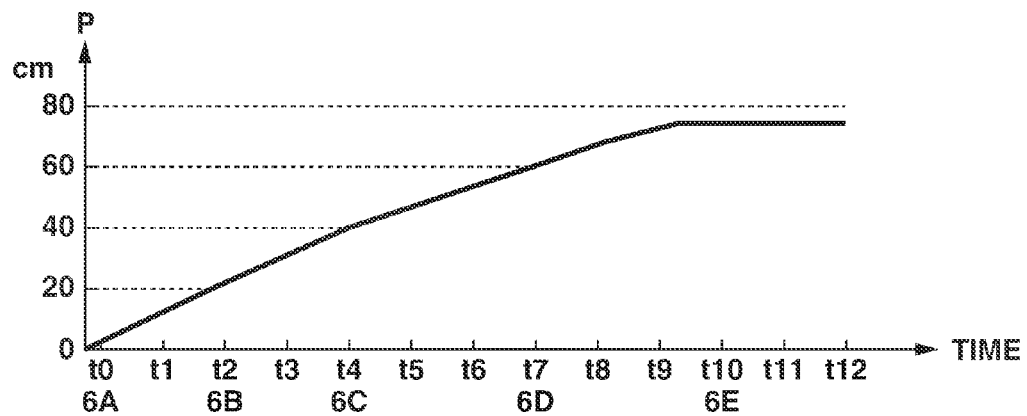

FIGS. 9A and 9B are graphs illustrating changes in position of the display apparatus 100 with respect to time. Here, a description is made with the assumption that the time IntervalT is 0.2 seconds, the threshold value Ath is 45°, and the threshold value Pth is 10 cm.

FIG. 9A illustrates positions of the display apparatus 100 taken when the user rotates the display apparatus 100 on the spot and views the display apparatus 100 as illustrated in FIGS. 4A and 4B. As illustrated in FIG. 9A, it is supposed that the time in the condition illustrated in FIG. 4A is time t0, the time 0.2 seconds later is time t1, the time 0.4 seconds later is time t2, and the time in the condition illustrated in FIG. 4B is time t3.

As illustrated in FIG. 9A, at any of the times t0 to t3, the display apparatus 100 moves only about 10 cm, but almost does not move. Accordingly, when the processing proceeds from step S803 to step S804, the control unit 101 determines that the position of the display apparatus 100 has not changed by an amount larger than the predetermined amount (NO in step S804), and the processing then proceeds to step S313. Thus, the control unit 101 performs display control to rotate an image with respect to the display apparatus 100.

FIG. 9B illustrates positions of the display apparatus 100 taken from when the user begins to lie down to when the user turns over while holding the display apparatus 100 in the vertical orientation, as illustrated in FIGS. 6A to 6E. As illustrated in FIG. 9B, it is supposed that the time in the condition illustrated in FIG. 6A is time t0, the time 0.4 seconds later in the condition illustrated in FIG. 6B is time t2, the time 0.8 seconds later in the condition illustrated in FIG. 6C is time t4, the time 1.4 seconds later in the condition illustrated in FIG. 6D is time t7, and the time 2.0 seconds later in the condition illustrated in FIG. 6E is time t10. Moreover, the change in angle of the display apparatus 100 with respect to time is similar to the above-described one illustrated in FIG. 6F.

Here, in order that the processing proceeds to display control processing in steps S313 to S316, determination is made at least in step S803 that the angular distance is greater than the threshold value Ath, and, thus, the processing proceeds to step S804. Here, the time at which it is determined in step S803 the angular distance is greater than the threshold value Ath is time t7 and subsequent times, as illustrated in FIG. 6F. However, even if the processing proceeds to step S804 in the case of time t7 or subsequent time, since the amount of movement of the display apparatus 100 is larger than 10 cm, which is the threshold value Pth, as illustrated in FIG. 9B, the processing proceeds to step S317, but does not proceed to display control processing in steps S313 to S316.

Furthermore, at time t10 and subsequent times, although the amount of movement of the display apparatus 100 becomes smaller than 10 cm, which is the threshold value Pth, since no change in orientation of the display apparatus 100 occurs, it is determined in step S803 that the angular difference is less than the threshold value Ath, and thus, the processing proceeds to step S317, but does not proceed to step S804. Accordingly, the control unit 101 does not perform display control to rotate an image with respect to the display apparatus 100.

In this way, even in a case where the speed of orientation change from a first orientation to a second orientation of the display apparatus 100 is higher than a predetermined speed, when the change in position of the display apparatus 100 is larger than a predetermined amount, it is presumed that the user has changed the orientation of the display apparatus 100 along with rotation of the body of the user. In this case, the control unit 101 performs display control based on the first orientation even after the orientation change. In other words, for example, even if the user quickly turns over and the orientation of the display apparatus 100 changes from the vertical orientation to the horizontal orientation, in a case where the movement of the display apparatus 100 occurs, the control unit 101 displays an image, which has been displayed in the vertical orientation even when the display apparatus 100 is in the horizontal orientation, without changing the displaying orientation of the image with respect to the display apparatus 100. Accordingly, the user can view the image in an intended displaying orientation.

Furthermore, in the above-described processing, suppose that, in a case where the user is in a vehicle that is driving or the user is walking, the user consciously rotates the display apparatus 100 in order to change the displaying orientation of an image with respect to the display apparatus 100. In this case, since the position of the display apparatus 100 is changing, the control unit 101 would determine that the amount of movement of the display apparatus 100 is larger than the threshold value, and thus, the processing does not proceed to the above-described display control processing in steps S313 to S316, so that such a situation that the displaying orientation of the image cannot be changed may occur. Accordingly, in order to exclude such a situation, the control unit 101 determines whether the position of the display apparatus 100 continues changing for longer than a predetermined time, and, if the position continues changing for longer than the predetermined time, presumes that the user is moving and thus omits processing in step S804. Thus, if it is determined in step S803 that the angular difference is greater than the threshold value, the processing can proceed to step S313.

Moreover, in the above-described exemplary embodiment, a case has been described in which the control unit 101 acquires the angle of the display apparatus 100 at intervals of unit time and, if the orientation of the display apparatus 100 has changed by an angle larger than a predetermined angle, proceeds to processing for determining whether the amount of movement of the display apparatus 100 is larger than a threshold value. However, this case is not limiting, but, for example, when the angle of the display apparatus 100 has changed by an angle lager than the predetermined angle, the control unit 101 can check whether no change in position of the display apparatus 100 has occurred. In this way, detecting a change in position of the display apparatus 100 as well as detecting the orientation of the display apparatus 100 enables accurately presuming the state of the display apparatus 100 and displaying an image in a displaying orientation intended by the user.

Figure 10:
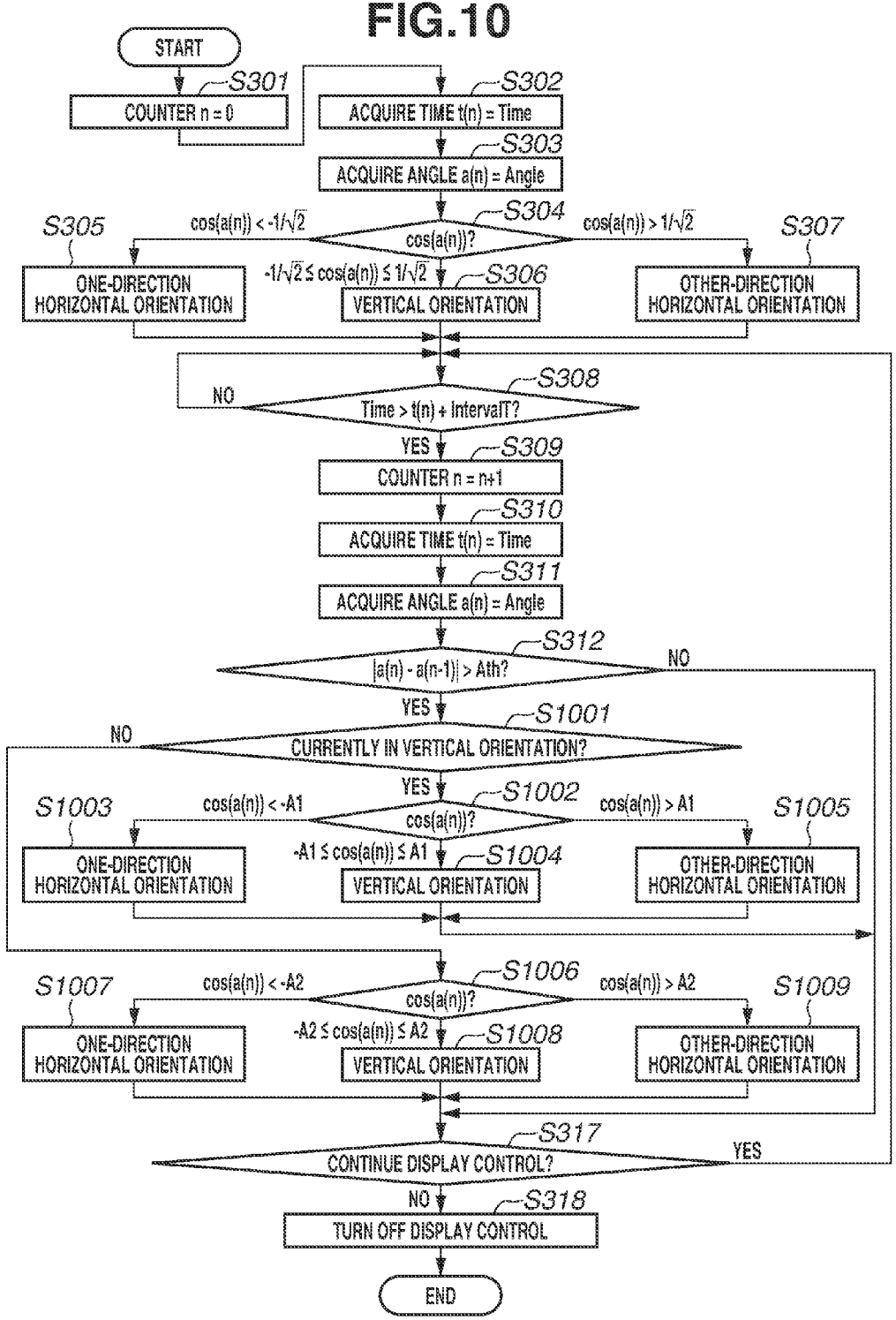

Next, display control according to a third exemplary embodiment is described with reference to the flowchart of FIG. 10. In the present exemplary embodiment, processing of hysteresis in display control is added to the flowchart of FIG. 3 described in the first exemplary embodiment. The flowchart illustrated in FIG. 10 is implemented by the control unit 101 loading a program recorded on the recording medium 107 onto the memory 106 and executing the program. Furthermore, the flowchart of FIG. 10 is the one obtained by replacing processing in steps S313 to S316 in the flowchart of FIG. 3 described in the first exemplary embodiment by processing in steps S1001 to S1009. Accordingly, in the flowchart of FIG. 10, the same steps as those in the flowchart of FIG. 3 are assigned the respective same step numbers, and the description thereof is omitted.

In step S1001 following step S312, the control unit 101 determines whether the display apparatus 100 is currently in the vertical orientation. If the control unit 101 determines that the display apparatus 100 is in the vertical orientation (YES in step S1001), the processing proceeds to step S1002. If the control unit 101 determines that the display apparatus 100 is in the horizontal orientation (NO in step S1001), the processing proceeds to step S1006. Processing in steps S1002 to S1005 and processing in steps S1006 to S1009 are processing for controlling displaying on the display unit 108 according to the orientation of the display apparatus 100.

In step S1002, the control unit 101 calculates "cos(a(n))" using the variable of angle a(n), and, in steps S1003 to S1005, the control unit 101 detects the orientation based on the value obtained by calculating "cos(a(n))". While, in the first exemplary embodiment, the value of "cos(a(n))" is determined based on determination values $1/\sqrt{2}$ and $-1/\sqrt{2}$, in a case where the display apparatus 100 is in the vertical orientation, the value of "cos(a(n))" is determined based on determination values A1 and −A1. Here, the determination value A1 is a value slightly larger than the determination value $1/\sqrt{2}$, and is, for example, 0.8 to 0.9.

On the other hand, also in step S1006, the control unit 101 calculates "cos(a(n))" using the variable of angle a(n), and, in steps S1007 to S1009, the control unit 101 detects the orientation based on the value obtained by calculating "cos(a(n))". While, in the first exemplary embodiment, the value of "cos(a(n))" is determined based on determination values $1/\sqrt{2}$ and $-1/\sqrt{2}$, in a case where the display apparatus 100 is in the horizontal orientation, the value of "cos(a(n))" is determined based on determination values A2 and −A2. Here, the determination value A2 is a value slightly smaller than the determination value $1/\sqrt{2}$, and is, for example, 0.3 to 0.4.

Accordingly, more specifically, when the orientation of the display apparatus 100 changes from the vertical orientation to the horizontal orientation, unless the angle of the display apparatus 100 becomes an angle approximate to 0° or 180°, it is not determined that the display apparatus 100 is in the horizontal orientation. Conversely, when the orientation of the display apparatus 100 changes from the horizontal orientation to the vertical orientation, unless the angle of the display apparatus 100 becomes an angle approximate to 90°, it is not determined that the display apparatus 100 is in the vertical orientation.

FIGS. 11A, 11B, 11C, and 11D illustrate examples of display of an image displayed on the display unit 108 when the orientation of the display apparatus 100 is changed from the condition illustrated in FIG. 4A to the condition illustrated in FIG. 4B. The conditions illustrated in FIGS. 11A to 11D are described while being contrasted with the conditions illustrated in FIGS. 5A to 5D described in the first exemplary embodiment.

Figure 11A:
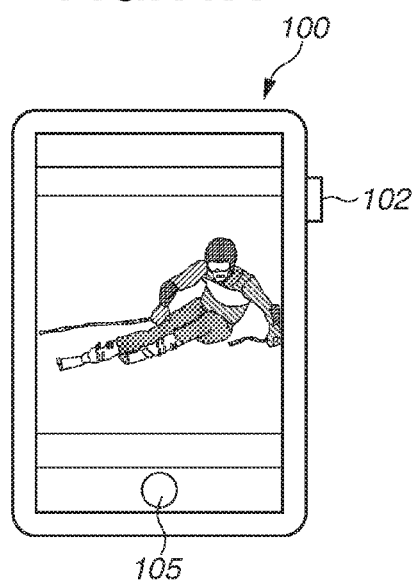
FIGS. 11A, 11B, 11C, and 11D illustrate examples of display of an image.
Figure 11C:
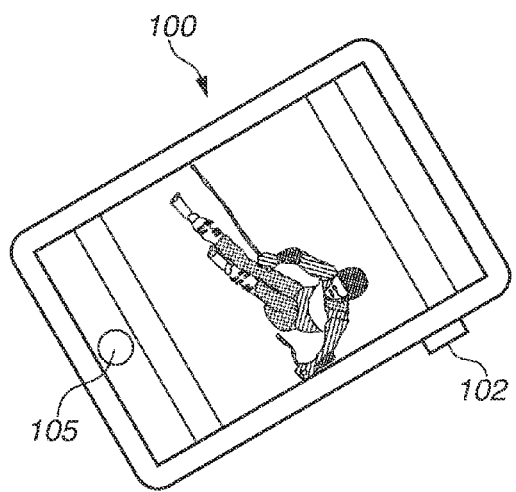
Figure 11B:
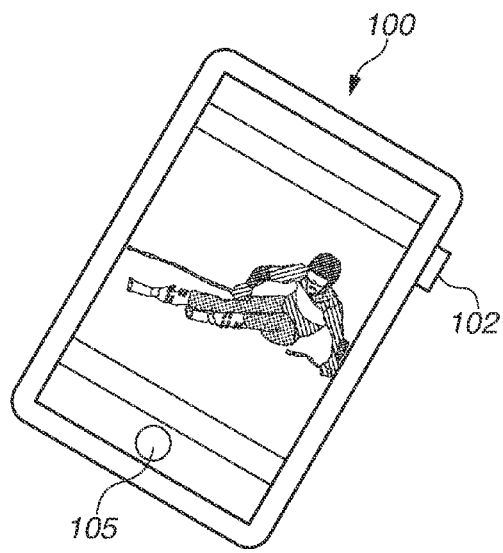

In the conditions illustrated in FIGS. 11A and 11B, the image is displayed in the same manner as in the conditions illustrated in FIGS. 5A and 5B.

FIG. 11C illustrates an example of display on the display unit 108 when the display apparatus 100 has been further rotated to the right from the condition illustrated in FIG.

11B. While, in FIG. 5C, an image obtained by rotating the image 90° to the left with respect to the display apparatus 100 is displayed on the display unit 108, the displaying orientation of the image with respect to the display apparatus 100 in FIG. 11C is the same as in FIG. 11B.

Figure 11D:
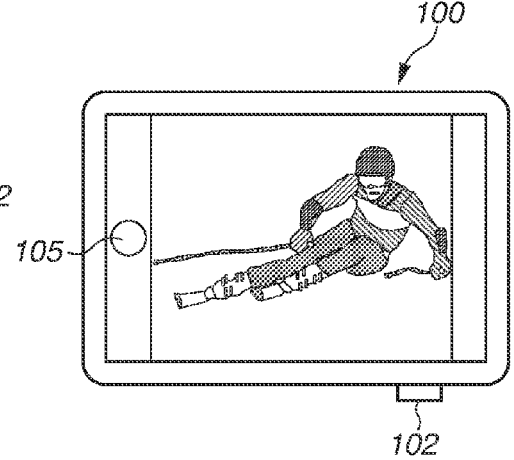

FIG. 11D illustrates an example of display on the display unit 108 when the display apparatus 100 has been further rotated to the right from the condition illustrated in FIG. 11C. The control unit 101 determines that the angle of the display apparatus 100 is approximate to 0° and the display apparatus 100 is in the horizontal orientation, and rotates the image, which has been displayed as illustrated in FIG. 11C, 90° to the left with respect to the display apparatus 100 and displays the rotated image on the display unit 108.

In this way, a determination value (angle) based on which the horizontal orientation is determined when the display apparatus 100 changes from the vertical orientation to the horizontal orientation and a determination value (angle) based on which the vertical orientation is determined when the display apparatus 100 changes from the horizontal orientation to the vertical orientation are made different from each other. Accordingly, even if the display apparatus 100 is used in such a manner that the angle thereof changes frequently and the output of the sensor 103 varies, the displaying orientation of an image can be prevented from changing frequently, so that image visibility can be improved.

In a fourth exemplary embodiment, a case is described in which the imaging unit 110 is used to apply the display control apparatus as an imaging apparatus. Here, the imaging apparatus is, for example, a digital camera. The imaging apparatus is able to, based on determined orientation information, append the orientation information to a captured image, perform rotation processing on the image, and record the processed image. In the present exemplary embodiment, among the processing operations in the flowchart of FIG. 3 and the flowchart of FIG. 8, processing in steps S305 to S307 and processing in steps S314 to S316 are changed as described below. Furthermore, in processing in steps S305 to S307 and processing in steps S314 to S316, displaying on the display unit 108 does not need to be controlled according to the orientation of the display apparatus 100, and control is performed mainly to detect the orientation of the imaging apparatus.

In step S305, the control unit 101 stores orientation information corresponding to the one-direction horizontal orientation in the memory 106. Furthermore, the control unit 101 displays, on the display unit 108, an orientation icon, which indicates the detected orientation, in a display form associated with the one-direction horizontal orientation. The control unit 101, when receiving an instruction for shooting from the user in the above-mentioned state, records, on the recording medium 107, an image captured by the imaging unit 110. At this time, the control unit 101 appends orientation information, which indicates that the imaging apparatus has been in the one-direction horizontal orientation, as attribute information to the image, and records the image with the orientation information appended thereto. Alternatively, the control unit 101 rotates the image to an angle corresponding to the one-direction horizontal orientation, and records the rotated image.

In step S306, the control unit 101 stores orientation information corresponding to the vertical orientation in the memory 106. Furthermore, the control unit 101 displays, on the display unit 108, an orientation icon, which indicates the detected orientation, in a display form associated with the vertical orientation. The control unit 101, when receiving an instruction for shooting from the user in the above-mentioned state, records, on the recording medium 107, an image captured by the imaging unit 110. At this time, the control unit 101 appends orientation information, which indicates that the imaging apparatus has been in the vertical orientation, as attribute information to the image, and records the image with the orientation information appended thereto. Alternatively, the control unit 101 rotates the image to an angle corresponding to the vertical orientation, and records the rotated image.

In step S307, the control unit 101 stores orientation information corresponding to the other-direction horizontal orientation in the memory 106. Furthermore, the control unit 101 displays, on the display unit 108, an orientation icon, which indicates the detected orientation, in a display form associated with the other-direction horizontal orientation. The control unit 101, when receiving an instruction for shooting from the user in the above-mentioned state, records, on the recording medium 107, an image captured by the imaging unit 110. At this time, the control unit 101 appends orientation information, which indicates that the imaging apparatus has been in the other-direction horizontal orientation, as attribute information to the image, and records the image with the orientation information appended thereto. Alternatively, the control unit 101 rotates the image to an angle corresponding to the other-direction horizontal orientation, and records the rotated image.

Moreover, processing in steps S314 to S316 is also similar to processing in steps S305 to S307. These processing operations correspond to an example of processing performed by a control unit.

Here, suppose a case where the user is moving the imaging apparatus in such a way as to cause a moving subject to fall within a shooting range. In the case of an imaging apparatus to which the first exemplary embodiment is applied, if a change in orientation of the imaging apparatus changes is relatively slow, the control unit 101 does not proceed to processing for detecting the orientation of the imaging apparatus. Accordingly, images captured during a period in which the orientation of the imaging apparatus is changing slowly are provided with the same orientation information to be appended thereto, and the images with the same orientation information appended thereto are recorded. Furthermore, in the case of an imaging apparatus to which the second exemplary embodiment is applied, even in a case where the orientation of the imaging apparatus has quickly changed, if the position of the imaging apparatus is moving to a great extent, the control unit 101 does not proceed to processing for detecting the orientation of the imaging apparatus. Accordingly, images captured during a period in which the imaging apparatus is moving are provided with the same orientation information to be appended thereto, and the images with the same orientation information appended thereto are recorded.

According to the present exemplary embodiment, when a captured image is displayed on the display unit 108, a subject included in the image can be prevented from being displayed in a displaying orientation that is not intended by the user. Here, for example, suppose a case of capturing images of a subject, such as an airplane taking off, by continuous shooting while following the airplane. In a case where the present exemplary embodiment is not applied, as the user moves the imaging apparatus in such a way as to gradually look up, the control unit 101 determines that the orientation of the imaging apparatus has changed on the way and re-detects the orientation of the imaging apparatus, so that a plurality of images captured by continuous shooting may be provided with pieces of orientation information different on the way to be appended thereto. Accordingly, in a case where a plurality of images captured by continuous shooting is viewed, the displaying orientation of images may change over on the way, so that the orientation of the imaged airplane may abruptly become an orientation different 90° from that of the preceding image. On the other hand, in a case where the present exemplary embodiment is applied, even if a slow orientation change or quick orientation change occurs, as long as it is an orientation change involving movement, the control unit 101 does not change orientation information on the imaging apparatus, so that, even when a plurality of images is viewed, the images can be viewed in a displaying orientation intended by the user.

While some exemplary embodiments of the present disclosure have been described above, the disclosure should not been construed to be limited to such specific exemplary embodiments, and various embodiments implemented without departing from the gist of the disclosure are also included in the disclosure. Furthermore, the above-described exemplary embodiments are merely some exemplary embodiments of the disclosure, and all or some of the exemplary embodiments can be combined as appropriate.

Although, in the above-described exemplary embodiments, a case has been described in which the power switch 102, the operation switch 105, and other switches are located at predetermined positions, this case is limiting. For example, the power switch 102, the operation switch 105, and other switches can be located at any positions of the display apparatus 100, and can be, for example, switches that are displayed on the display unit 108 and are operable via the touch panel 109.

Although, in the above-described exemplary embodiments, cases have been described in which the display apparatus 100 is applied to a mobile phone terminal and the imaging apparatus is applied to a digital camera, these cases are not limiting, and the disclosure can also be applied to an instrument capable of detecting the orientation of an apparatus. For example, the disclosure can be applied to a tablet terminal, a personal digital assistant (PDA), a portable image viewer, a digital photo frame, a music player, a game machine, and an electronic book reader.

Although, in the above-described exemplary embodiments, a case has been described in which a still image is processed, a moving image can also be processed in a similar way.

Furthermore, a control operation of the control unit 101 can be performed by a single piece of hardware, or control over the entire apparatus can be performed with processing shared by a plurality of pieces of hardware.

According to exemplary embodiments of the disclosure, an image can be displayed in a displaying orientation intended by the user.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-197907 filed Oct. 5, 2015, which is hereby incorporated by reference herein in its entirety.

What is claimed is:

1. A display control apparatus for controlling displaying of a display unit, the display control apparatus comprising:
    an orientation detection unit configured to detect an orientation of the display control apparatus; and
    a display control unit configured to, when an orientation change from a first orientation to a second orientation of the display control apparatus is detected by the orientation detection unit,
    perform display control based on the second orientation after the orientation change in a case where a speed of the orientation change is higher than a predetermined speed, and
    perform display control based on the first orientation even after the orientation change in a case where the speed of the orientation change is lower than or equal to the predetermined speed.

2. The display control apparatus according to claim 1, further comprising a position detection unit configured to detect a position of the display control apparatus,
    wherein, when the orientation change from the first orientation to the second orientation of the display control apparatus is detected by the orientation detection unit, even in a case where the speed of the orientation change is higher than the predetermined speed, the display control unit performs the display control based on the first orientation even after the orientation change in a case where a change in position larger than a predetermined amount is detected by the position detection unit during the orientation change.

3. The display control apparatus according to claim 2, wherein, when the orientation change from the first orientation to the second orientation of the display control apparatus is detected by the orientation detection unit, the display control unit performs the display control based on the second orientation after the orientation change in a case where the speed of the orientation change is higher than the predetermined speed and a change in position of the display control apparatus is continuously detected by the position detection unit.

4. The display control apparatus according to claim 2, wherein the position detection unit detects the position of the display control apparatus based on at least one of a radio wave compliant with Global Positioning System (GPS) or wireless network communication and outputs from an acceleration sensor and a gyro sensor.

5. The display control apparatus according to claim 1, wherein a displaying orientation of an image with respect to the display unit differs between the display control performed based on the first orientation and the display control performed based on the second orientation.

6. The display control apparatus according to claim 1, wherein the first orientation is a vertical orientation, and the second orientation is a horizontal orientation, and
wherein a displaying orientation of an image with respect to the display unit differs 90° between the display control performed based on the first orientation and the display control performed based on the second orientation.

7. The display control apparatus according to claim 1, wherein an angle based on which a displaying orientation of an image with respect to the display unit is changed to a different displaying orientation differs between a case where the orientation change from the first orientation to the second orientation occurs and a case where the orientation change from the second orientation to the first orientation occurs.

8. The display control apparatus according to claim 1, wherein the orientation detection unit detects the orientation of the display control apparatus based on at least one of outputs from an acceleration sensor, a gyro sensor, and a geomagnetic sensor.

9. A control method for a display control apparatus for controlling displaying of a display unit, the control method comprising:
detecting an orientation of the display control apparatus; and
when an orientation change from a first orientation to a second orientation of the display control apparatus is detected,
performing display control based on the second orientation after the orientation change in a case where a speed of the orientation change is higher than a predetermined speed, and
performing display control based on the first orientation even after the orientation change in a case where the speed of the orientation change is lower than or equal to the predetermined speed.

10. An imaging apparatus comprising:
an orientation detection unit configured to detect an orientation of the imaging apparatus; and
a control unit configured to, when an orientation change from a first orientation to a second orientation of the imaging apparatus is detected by the orientation detection unit,
perform control based on the second orientation after the orientation change in a case where a speed of the orientation change is higher than a predetermined speed, and
perform control based on the first orientation even after the orientation change in a case where the speed of the orientation change is lower than or equal to the predetermined speed.

11. The imaging apparatus according to claim 10, wherein the control performed based on the first orientation and the control performed based on the second orientation are control for appending orientation information indicating respective different orientations to a captured image.

12. The imaging apparatus according to claim 10, wherein the control performed based on the first orientation and the control performed based on the second orientation are control for rotating a captured image to respective directions corresponding to the first orientation and the second orientation and recording the rotated image.

13. The imaging apparatus according to claim 10, wherein the control performed based on the first orientation and the control performed based on the second orientation are control for displaying an orientation icon in respective display forms corresponding to the first orientation and the second orientation.

14. The imaging apparatus according to claim 10, wherein the first orientation is a vertical orientation, and the second orientation is a horizontal orientation different 90° from the first orientation.

15. A control method for an imaging apparatus, the control method comprising:
detecting an orientation of the imaging apparatus; and
when an orientation change from a first orientation to a second orientation of the imaging apparatus is detected,
performing control based on the second orientation after the orientation change in a case where a speed of the orientation change is higher than a predetermined speed, and
performing control based on the first orientation even after the orientation change in a case where the speed of the orientation change is lower than or equal to the predetermined speed.

16. A non-transitory computer-readable storage medium storing computer-executable instructions that, when executed by a computer, cause the computer to perform a method for a display control apparatus for controlling displaying of a display unit, the method comprising:
detecting an orientation of the display control apparatus; and
when an orientation change from a first orientation to a second orientation of the display control apparatus is detected,
performing display control based on the second orientation after the orientation change in a case where a speed of the orientation change is higher than a predetermined speed, and
performing display control based on the first orientation even after the orientation change in a case where the speed of the orientation change is lower than or equal to the predetermined speed.

17. A non-transitory computer-readable storage medium storing computer-executable instructions that, when executed by a computer, cause the computer to perform a method for an imaging apparatus, the method comprising:
detecting an orientation of the imaging apparatus; and
when an orientation change from a first orientation to a second orientation of the imaging apparatus is detected,
performing control based on the second orientation after the orientation change in a case where a speed of the orientation change is higher than a predetermined speed, and
performing control based on the first orientation even after the orientation change in a case where the speed of the orientation change is lower than or equal to the predetermined speed.

* * * * *